United States Patent
Shiu et al.

(10) Patent No.: US 11,502,504 B2
(45) Date of Patent: Nov. 15, 2022

(54) LOW VOLTAGE CONTROL SYSTEM, LOW VOLTAGE PROTECTION METHOD FOR AN ELECTRONIC DEVICE AND A COMPUTER PROGRAM PRODUCT THEREOF

(71) Applicant: Gunitech Corp., Qiionlin Township, Hsinchu County (TW)

(72) Inventors: Huan-Ruei Shiu, Qionlin Township (TW); Hsin-Yi Kao, Qionlin Township (TW); Chung-Liang Hsu, Qionlin Township (TW); Xiao-Juan Lin, Qionlin Township (TW); Ming-Yi Wang, Qionlin Township (TW)

(73) Assignee: Gunitech Corp., Qionlin Township (TW)

(*) Notice: Subject to any disclaimer, the term of this patent is extended or adjusted under 35 U.S.C. 154(b) by 170 days.

(21) Appl. No.: 16/891,484

(22) Filed: Jun. 3, 2020

(65) Prior Publication Data

US 2021/0194238 A1    Jun. 24, 2021

Related U.S. Application Data

(60) Provisional application No. 62/952,707, filed on Dec. 23, 2019.

(51) Int. Cl.
*G06F 1/28* (2006.01)
*H02H 3/24* (2006.01)

(52) U.S. Cl.
CPC ............... *H02H 3/243* (2013.01); *G06F 1/28* (2013.01)

(58) Field of Classification Search
CPC .................................. G06F 1/28; H02H 3/243
See application file for complete search history.

(56) References Cited

U.S. PATENT DOCUMENTS

| | | | | |
|---|---|---|---|---|
| 9,672,878 | B1* | 6/2017 | de Cremoux | G11C 7/1063 |
| 10,031,189 | B1* | 7/2018 | Wang | G01R 31/40 |
| 2009/0089605 | A1* | 4/2009 | Westwick | H03K 17/223 |
| | | | | 713/340 |
| 2014/0068310 | A1* | 3/2014 | Sultenfuss | G06F 1/30 |
| | | | | 713/340 |
| 2015/0025821 | A1* | 1/2015 | Kim | G11B 19/047 |
| | | | | 702/60 |
| 2015/0081989 | A1* | 3/2015 | Lee | G06F 12/0607 |
| | | | | 711/157 |
| 2016/0042791 | A1* | 2/2016 | Sakui | G11C 16/0483 |
| | | | | 365/185.05 |

* cited by examiner

*Primary Examiner* — Harry R Behm
(74) *Attorney, Agent, or Firm* — Alan D Kamrath; Karin L. Williams; Mayer & Williams PC

(57) ABSTRACT

A low voltage control system, a low voltage protection method for an electronic device, and a computer program product thereof are disclosed. The electronic device includes a power supply and a memory. The low voltage protection method for the electronic device includes the following steps: detecting a current voltage of the power supply; determining whether the current voltage is lower than a first voltage threshold; and if the voltage is lower than the first voltage threshold, a control module cutting off multiple access channels.

3 Claims, 3 Drawing Sheets

LOW VOLTAGE CONTROL SYSTEM, LOW VOLTAGE PROTECTION METHOD FOR AN ELECTRONIC DEVICE AND A COMPUTER PROGRAM PRODUCT THEREOF

BACKGROUND OF THE INVENTION

1. Field of the Invention

The present invention relates to a low voltage control system for an electronic device, a low voltage protection method for an electronic device and a computer program product thereof; more particularly, the present invention relates to a low voltage control system for an electronic device, a low voltage protection method for an electronic device and a computer program product thereof capable of limiting a flash read/write permission by means of determining whether a current voltage of a power supply is lower than a threshold.

2. Description of the Related Art

When the voltage of an electronic device is insufficient to drive the software and hardware of the electronic device to operate, the insufficiency is very likely to cause instantaneous interruption of the operation of the electronic device; if the software is accessing data of the flash memory at this time, such an abnormal interruption may result in incomplete hardware signals in the electronic device and thereby cause disorder in the memory data, which could make the electronic device boot or operate abnormally. Conventionally, if the electronic device is at a low voltage, a blinking light is used to remind the user to replace or recharge the battery. However, the blinking light itself will also accelerate the consumption of the battery power; moreover, the blinking light cannot solve the root cause of the problem of failure to access flash memory data due to the current voltage insufficiency of the electronic device, which still leaves room for improvement.

Therefore, there is a need to provide a low voltage control system for an electronic device, a low voltage protection method for an electronic device and a computer program product thereof to mitigate and/or obviate the aforementioned problems.

SUMMARY OF THE INVENTION

It is an object of the present invention to provide a low voltage control system for an electronic device, a low voltage protection method for an electronic device and a computer program product thereof capable of limiting a flash read/write permission by means of determining whether a current voltage of a power supply is lower than a threshold.

It is another object of the present invention to provide a low voltage control system for an electronic device, a low voltage protection method for an electronic device and a computer program product thereof, which can be used in a boot procedure of an electronic device such that if the current voltage of the electronic device is insufficient for the electronic device to execute a complete boot procedure, the present invention can hold the electronic device in a half-started state and also limit a flash read/write permission, thereby preventing the electronic device from abnormal boot or boot failure due to data disorder caused by an unstable current voltage of the electronic device.

To achieve the abovementioned objects, the low voltage control system for an electronic device of the present invention is used in an electronic device. The electronic device comprises a power supply and a memory. The memory includes a plurality of access channels. The low voltage control system for an electronic device comprises a voltage detection module and a control module. The voltage detection module is used for detecting a current voltage of the power supply. The control module is electrically connected to the voltage detection module and is used for determining whether the current voltage is lower than a first voltage threshold. If the current voltage is lower than the first voltage threshold, the control module will cut off the plurality of access channels.

The present invention further provides a low voltage protection method for an electronic device, which is used in an electronic device. The electronic device comprises a power supply and a memory. The low voltage protection method for an electronic device comprises the following steps: detecting a current voltage of the power supply; determining whether the current voltage is lower than a first voltage threshold; and if the current voltage is lower than the first voltage threshold, a control module cutting off a plurality of access channels.

Moreover, the present invention provides a computer program product, which is loaded into an electronic device and used for executing the low voltage protection method for an electronic device of the present invention.

The present invention can limit the flash read/write permission for an operation unit to access a memory by determining whether the current voltage of the power supply is lower than a first threshold or a second threshold so as to prevent data disorder caused by an unstable current voltage of the power supply. Furthermore, when the low voltage control system for an electronic device and the low voltage protection method for an electronic device of the present invention are used in a boot procedure of the electronic device, the present invention can hold the electronic device in a half-started state and also limit the flash read/write permission of the operation unit to access the memory if the current voltage of the electronic device is insufficient to allow the electronic device to complete the normal boot procedure. As a result, the present invention prevents the electronic device from abnormal boot or boot failure due to data disorder caused by an unstable current voltage, thereby improving the deficiency of conventional techniques.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
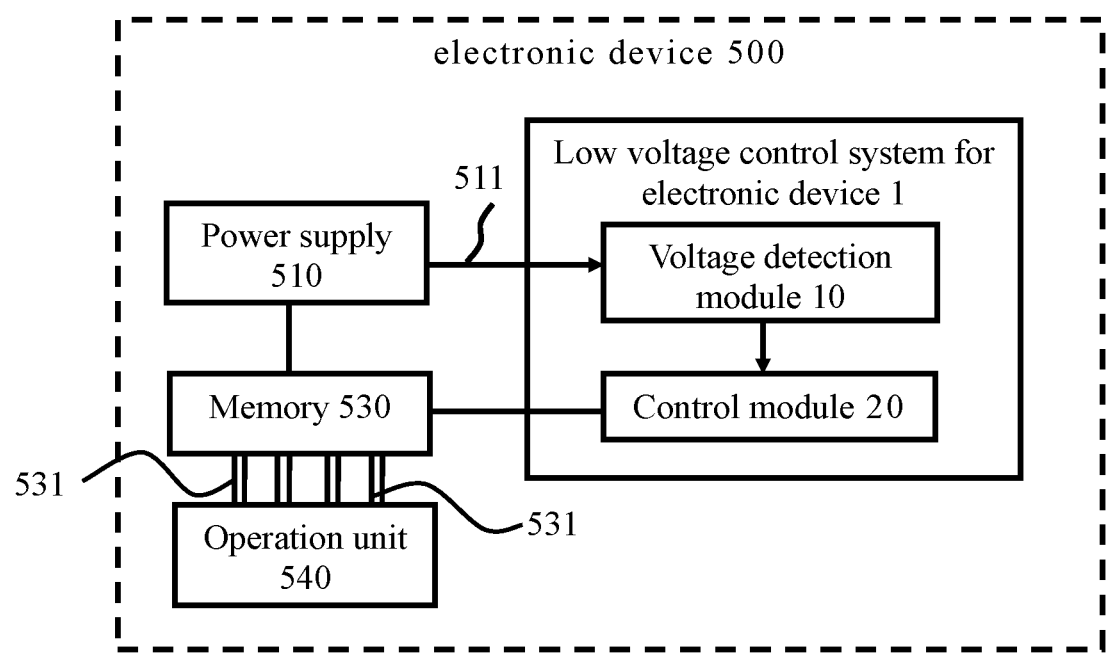
FIG. 1 illustrates a schematic drawing of a low voltage control system for an electronic device according to the present invention.

Please refer to FIG. 1, which illustrates a schematic drawing of a low voltage control system for an electronic device according to the present invention.

As shown in FIG. 1, in this embodiment, the low voltage control system for an electronic device 1 of the present invention is used in an electronic device 500. The electronic device 500 comprises a power supply 510, a memory 530 and an operation unit 540. The memory 530 includes a plurality of access channels 531 for the operation unit 540 to access data and operation commands in the memory 530. According to one embodiment of the present invention, the electronic device 500 can be a desktop computer, a laptop computer, a tablet PC, a mobile device (such as a smart phone) or a wearable device (such as a smart watch); the power supply 510 is a lithium battery; the memory 530 is a flash memory; the access channels 531 includes a serial peripheral interface (SPI), an inter-integrated circuit ($I^2C$) and a universal asynchronous receiver/transmitter (UART); and the operation unit 540 is a central processing unit (CPU).

As shown in FIG. 1, in one embodiment of the present invention, the low voltage control system for an electronic device 1 of the present invention comprises a voltage detection module 10 and a control module 20. The control module 20 is electrically connected to the voltage detection module 10. The voltage detection module 10 is used for detecting a current voltage 511 of the power supply 510. The control module 20 is used for determining whether the current voltage 511 is lower than a first voltage threshold. If the current voltage 511 is lower than the first voltage threshold, the control module 20 will cut off the plurality of access channels 531 so as to prevent the electronic device 500 from abnormal operations due to data disorder of the operation unit 540 caused by the low supplied voltage, thereby improving the operation stability of the electronic device 500. In this embodiment, the first voltage threshold is 0.21 V. If the current voltage 511 is lower than 0.21 V, the control module 20 will determine that the electronic device 500 is in a low-supplied-voltage state; therefore, at this time the control module 20 will cut off the plurality of access channels 531. Please note that the voltage detection module 10 and the control module 20 can be disposed independently or combined together. Further, the embodiment disclosed herein is one of many preferred embodiments only. To avoid redundant descriptions, not all possible variations and combinations are disclosed in detail in this specification.

As shown in FIG. 1, in one embodiment of the present invention, the control module 20 not only determines whether the current voltage 511 is lower than the first voltage threshold but also determines whether the current voltage 511 is lower than a second voltage threshold, wherein the second voltage threshold is 2.1 V. If the current voltage 511 is lower than the second voltage threshold, the control module 20 will issue a warning signal. In this embodiment, the warning signal causes a built-in LED light of the electronic device 500 to blink in order to remind the user to replace or recharge the battery of the electronic device 500. Please note that the first voltage threshold is one-tenth of the second voltage threshold. In other words, in this embodiment, the control module 20 will first utilize the LED light to remind the user to replace or recharge the battery when the current voltage 511 of the electronic device 500 is lower than the second voltage threshold. If the low voltage state has not changed, the control module 20 will continuously monitor whether the current voltage 511 continues to decline. Once the current voltage 511 is lower than the first voltage threshold, the control module 20 will cut off the plurality of access channels 531 to prevent the electronic device 500 from abnormal operations due to data disorder.

According to another embodiment of the present invention, the low voltage control system for an electronic device 1 of the present invention is used in a boot procedure of the electronic device 500. When the electronic device 500 executes the boot procedure, if the control module 20 determines that the current voltage 511 is lower than the first voltage threshold, the control module 20 will cut off the plurality of access channels 531 and terminate the boot procedure of the electronic device 500 so as to hold the electronic device 500 in a half-started state, thereby preventing the electronic device 500 from abnormal boot or boot failure due to data disorder of the operation unit 540 caused by the unstable current voltage 511 of the electronic device 500. Please note that the half-started state means the state of only turning on the light signals or other auxiliary functions of the electronic device 500 without completing the boot procedure, which means the electronic device 500 does not fully execute the complete boot procedure.

Figure 2:
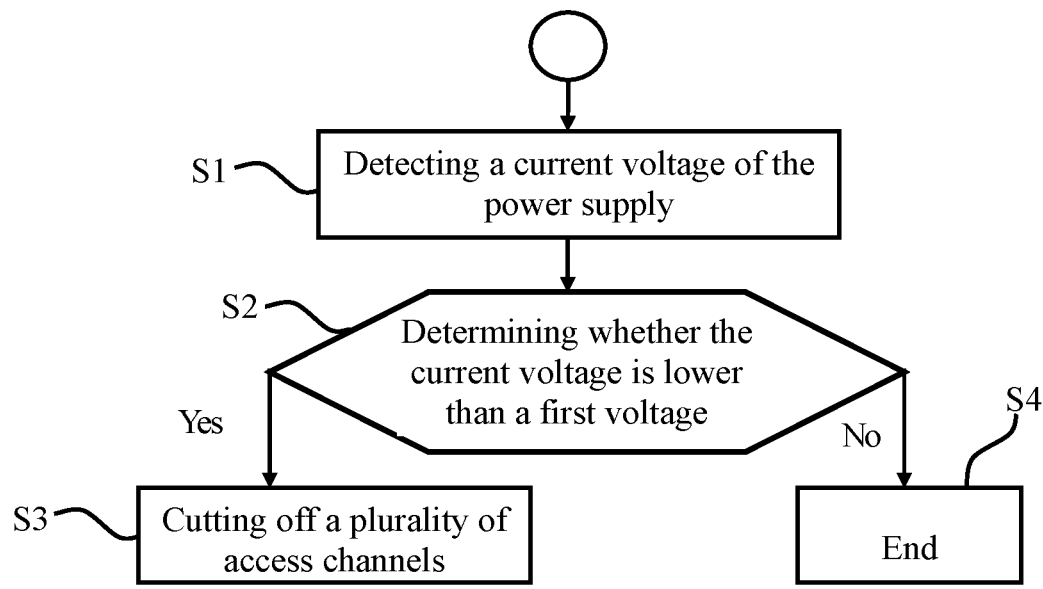
FIG. 2 illustrates a flowchart of a low voltage protection method for an electronic device according to a first embodiment of the present invention.

Next, please refer to both FIG. 1 and FIG. 2, wherein FIG. 2 illustrates a flowchart of a low voltage protection method for an electronic device according to a first embodiment of the present invention. The low voltage protection method for an electronic device of the present invention is used in an electronic device 500. The electronic device 500 comprises a power supply 510, a memory 530 and an operation unit 540. The electronic device 500 can be a desktop computer, a laptop computer, a tablet PC, a mobile device (such as a smart phone) or a wearable device (such as a smart watch); the power supply 510 is a lithium battery; the memory 530 is a flash memory; the access channels 531 include a serial peripheral interface (SPI), an inter-integrated circuit ($I^2C$) and a universal asynchronous receiver/transmitter (UART); and the operation unit 540 is a central processing unit (CPU). Further, the computer program product of the present invention can be loaded into the electronic device 500 so as to execute the steps of the first embodiment, the second embodiment and the third embodiment of the low voltage protection method for an electronic device of the present invention. As shown in FIG. 2, the first embodiment of the low voltage protection method for an electronic device of the present invention comprises steps S1 to S4. Please also refer to FIG. 1 for better understanding the steps as shown in FIG. 2 sequentially.

Step S1: detecting a current voltage of the power supply.

The voltage detection module 10 is used for detecting the current voltage 511 of the power supply 510.

Step S2: determining whether the current voltage is lower than a first voltage threshold.

If the current voltage 511 is lower than the first voltage threshold, the control module 20 will cut off the plurality of access channels 531 (step S3). In this embodiment, the first voltage threshold 511 is 0.21 V. If the current voltage 511 is lower than 0.21 V, the control module 20 will determine that the electronic device 500 is in a low-supplied-voltage state; therefore, at this time the control module 20 will activate a low voltage protection mechanism for an electronic device in order to cut off the plurality of access channels 531, thereby preventing the electronic device 500 from abnormal operations due to data disorder of the operation unit 540 caused by the low current voltage 511, and thus improving the operation stability of the electronic device 500. In this embodiment, if the current voltage 511 is higher than the first voltage threshold, commands related to interfering with or interrupting a current operation mode of the electronic device 500 will not be executed.

Figure 3:
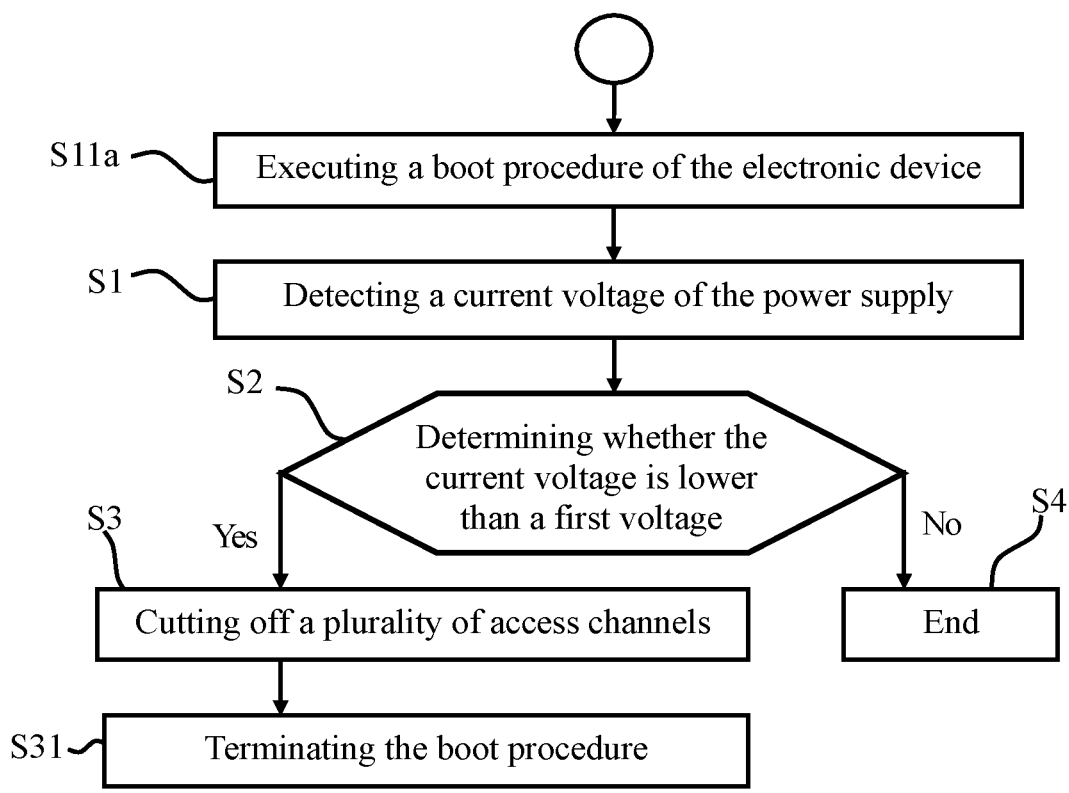
FIG. 3 illustrates a flowchart of the low voltage protection method for an electronic device according to a second embodiment of the present invention.

Please refer to both FIG. 1 and FIG. 3, wherein FIG. 3 illustrates a flowchart of the low voltage protection method for an electronic device according to a second embodiment of the present invention. Unlike the low voltage protection method for an electronic device according to the first embodiment of the present invention, the second embodiment, as shown in FIG. 3, further comprises step S11a and step S31. Details of step S11a and step S31 will be further explained hereinafter.

Step S11a: executing a boot procedure of the electronic device.

In the second embodiment, the low voltage protection method for an electronic device of the present invention is used in a boot procedure of the electronic device 500. When the electronic device 500 executes the boot procedure, the control module 20 will determine whether the current voltage 511 is lower than the first voltage threshold (step S1). If the control module 20 determines that the current voltage 511 is lower than the first voltage threshold (step S2), the control module 20 will cut off the plurality of access channels 531 (step S3) and terminate the boot procedure of the electronic device 500 (step S31) so as to hold the electronic device 500 in a half-started state, thereby preventing the electronic device 500 from abnormal boot or boot failure due to data disorder of the operation unit 540 caused by the unstable voltage of the electronic device 500. Please note that the half-started state means the state of only turning on the light signals or other auxiliary functions of the electronic device 500 without completing the boot procedure, which means the electronic device 500 does not fully execute the complete boot procedure.

Figure 4:
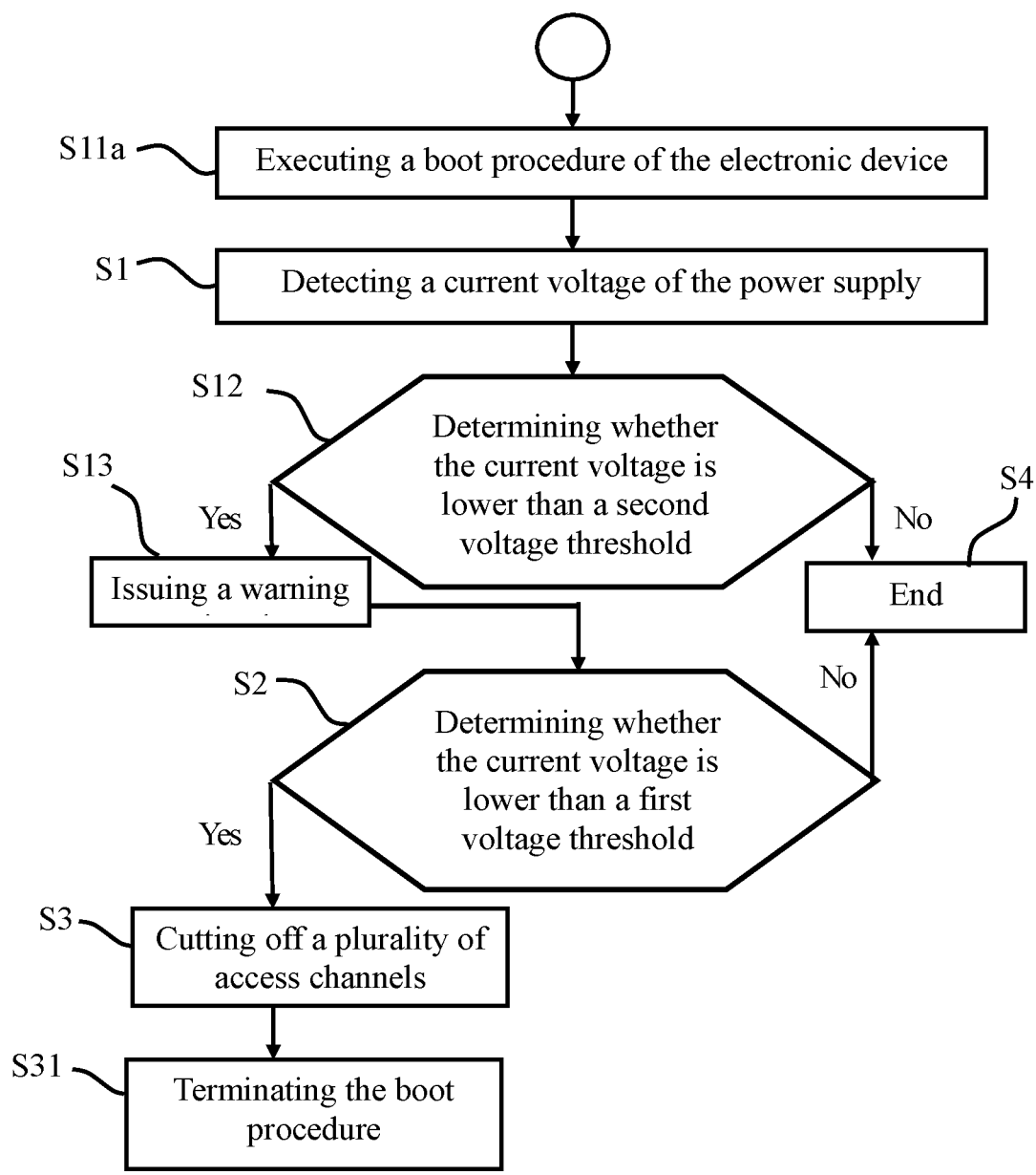
FIG. 4 illustrates a flowchart of the low voltage protection method for an electronic device according to a third embodiment of the present invention.

Please refer to both FIG. 1 and FIG. 4, wherein FIG. 4 illustrates a flowchart of the low voltage protection method for an electronic device according to a third embodiment of the present invention. Unlike the low voltage protection method for an electronic device according to the second embodiment of the present invention, the third embodiment as shown in FIG. 4 further comprises step S12 and step S13. Details of step S12 and step S13 will be further explained hereinafter.

Step S12: determining whether the current voltage is lower than a second voltage threshold.

When the electronic device 500 executes the boot procedure, the control module 20 not only determines whether the current voltage 511 is lower than the first voltage threshold but also determines whether the current voltage 511 is lower than a second voltage threshold, wherein the second voltage threshold is 2.1 V. If the current voltage 511 is lower than the second voltage threshold, the control module 20 will issue a warning signal. In this embodiment, the warning signal causes a built-in LED light of the electronic device 500 to blink in order to remind the user to replace or recharge the battery of the electronic device 500. Please note that the first voltage threshold is one-tenth of the second voltage threshold. Therefore, when the control module 20 determines that the current voltage 511 of the electronic device 500 is lower than the second voltage threshold, the control module 20 will first utilize the LED light to remind the user to replace or recharge the battery of the electronic device 500. When the electronic device 500 executes the boot procedure, if the current voltage 511 of the electronic device 500 is still lower than the second voltage threshold, the control module 20 will continuously monitor whether the current voltage 511 continues to decline. Once the current voltage 511 is lower than the first voltage threshold, the control module 20 will cut off the plurality of access channels 531 to prevent the electronic device 500 from abnormal operations due to data disorder.

The present invention can limit the flash read/write permission of the operation unit 540 to access the memory 530 by means of determining whether the current voltage 511 of the power supply 510 is lower than a first threshold or a second threshold so as to prevent data disorder caused by an unstable current voltage 511 of the power supply 510. Furthermore, when the low voltage control system for an electronic device and the low voltage protection method for an electronic device of the present invention are used in a boot procedure of the electronic device 500, the present invention can hold the electronic device 500 in a half-started state and also limit the flash read/write permission of the operation unit 540 to access the memory 530 if the current voltage 511 of the electronic device 500 is insufficient to allow the electronic device 500 to complete the normal boot procedure. As a result, the present invention prevents the electronic device 500 from abnormal boot or boot failure due to data disorder caused by an unstable current voltage 511, thereby improving the deficiency of conventional techniques.

Although the present invention has been explained in relation to its preferred embodiments, it is to be understood that many other possible modifications and variations can be made without departing from the spirit and scope of the invention as hereinafter claimed.

What is claimed is:

1. A low voltage control system for an electronic device, used in a boot procedure of an electronic device, wherein the electronic device comprises a power supply and a memory, and the memory includes a plurality of access channels, the low voltage control system for the electronic device comprising:
   a voltage detection module, used for detecting a current voltage of the power supply; and
   a control module, electrically connected to the voltage detection module, wherein the control module is used for determining whether the current voltage is lower than a first voltage threshold or a second voltage threshold, and if the current voltage is lower than the first voltage threshold, the control module will cut off the plurality of access channels and terminate the boot procedure of the electronic device so as to hold the electronic device in a half-started state; if the current voltage is lower than the second voltage threshold, the control module will issue a warning signal,
   wherein the first voltage threshold is one-tenth of the second voltage threshold.

2. A low voltage protection method for an electronic device, used in a boot procedure of an electronic device, wherein the electronic device comprises a power supply and a memory, the low voltage protection method for the electronic device comprising the following steps:
   detecting a current voltage of the power supply;
   determining whether the current voltage is lower than a first voltage threshold or a second voltage threshold;

cutting off a plurality of access channels and terminating the boot procedure of the electronic device by a control module so as to hold the electronic device in a half-started state if the current voltage is lower than the first voltage threshold; and issuing a warning signal by the control module if the current voltage is lower than the second voltage threshold, wherein the first voltage threshold is one-tenth of the second voltage threshold.

3. A non-transitory computer-readable storage medium in an electronic device for implementing the low voltage protection method for the electronic device as claimed in claim 2.

* * * * *